United States Patent [19]

Chant

[11] 3,889,773
[45] June 17, 1975

[54] DRIVE DISCONNECT FOR MOTORIZED WHEELCHAIR

[75] Inventor: John Bernard Chant, Alton, England

[73] Assignee: Vessa Limited, Alton, England

[22] Filed: Feb. 5, 1974

[21] Appl. No.: 439,750

[30] Foreign Application Priority Data

Feb. 5, 1973  United Kingdom............... 5640/73

[52] U.S. Cl............. 180/65 R; 74/405; 180/DIG. 3
[51] Int. Cl............................................... B60k 1/00
[58] Field of Search . 180/65 R, 70 R, 44 E, DIG. 3; 74/405, 414; 192/70.24, 70.23, 93 A, 93 B, 93 R

[56] References Cited
UNITED STATES PATENTS

| 2,544,831 | 3/1951 | Guyton | 180/DIG. 3 |
|---|---|---|---|
| 2,586,273 | 2/1952 | Steven | 180/DIG. 3 |
| 2,618,170 | 11/1952 | Mulcahy | 74/405 |
| 3,766,795 | 10/1973 | Priest | 74/405 |
| 3,770,073 | 11/1973 | Meyer | 180/70 R |
| 3,786,887 | 1/1974 | Rosenthal et al. | 180/DIG. 3 |
| 3,800,901 | 4/1974 | Blomstrom et al. | 180/70 R |

Primary Examiner—Leo Friaglia
Assistant Examiner—David M. Mitchell
Attorney, Agent, or Firm—Imirie, Smiley & Linn

[57] ABSTRACT

The invention provides an electric motorized unit for wheelchairs in which manual handling is facilitated by shifting a wheel hub driving gear axially over a key out of mesh with a gear driven by an electric motor so as to eliminate drag due to motor torque.

4 Claims, 1 Drawing Figure

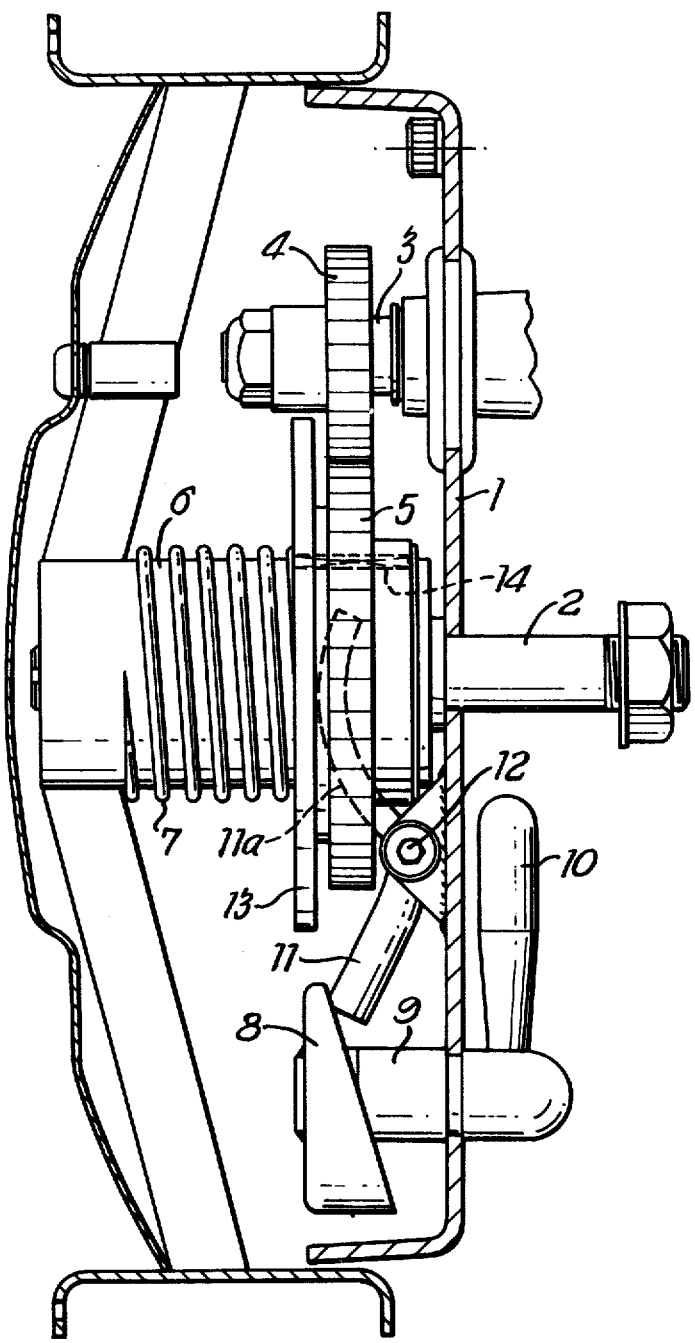

DRIVE DISCONNECT FOR MOTORIZED WHEELCHAIR

This invention relates to improvements in motor drives for wheel chairs.

Experience in experimental trials shows that the virtual locking of the driven wheels which takes place when the motors are unpowered, for example when the batteries are removed for folding the chair, makes manual handling extremely awkward.

According to the present invention we provide an electrical driving unit for a wheel of a wheelchair comprising a mounting plate attached to a fixed wheel axle and carrying an electric motor and wheel driving gears wherein a manually operable member passing through the mounting plate is actuable to shift a wheel hub driving gear axially over a key so as to disconnect the drive between motor and wheel hub.

Preferably the manually operable member is constituted by a rotatable shaft carrying a snail cam. The snail cam bears upon a pivoted cranked yoke engaged with a disc affixed to the gear wheel hub to shift it axially against spring pressure.

A preferred construction embodying the invention is illustrated in the accompanying drawing which is an end elevation in partial section.

A mounting plate 1 carries a fixed shaft 2 and an electric motor (not shown) whose output shaft 3 carries a gear wheel 4.

The gear wheel 4 is meshed with a gear wheel 5 slidable axially over a key 14 in a freely rotatable wheel hub 6.

A coil spring 7 urges the gear wheels into mesh as shown in the drawing.

A snail cam 8 fixed to the end of a shaft 9 is actuable by a manual lever 10 and contacts one arm of a duplex cranked yoke 11. The other arms 11a of the yoke 11 abut a disc 13 affixed to the gears and slidable with it over the key 14.

Rotation of the lever 10 through 180° from the position illustrated causes the yoke 11 to rock about its pivot 12 and thus disengages the gear wheel from the gear wheel 4.

Nicks formed in the face of the cam 8 may give an indication of the fully meshed and unmeshed position of the gear wheel 5.

The gear shifting mechanism described above is found both simple and effective in operation, but it will be clear that alternative mechanisms operated by a member passing through the mounting plate, may be used to shift either one of the gear wheels 4 and 5 axially over a key to and from the meshed position.

I claim:

1. An electrical driving unit for a wheel or a wheel chair comprising a mounting plate attached to a fixed wheel axle and carrying an electric motor whose output shaft passes through the said plate, a gear mounted on the said shaft and normally meshed with a gear axially slidable over a key in a wheel hub freely rotatable on the said axle and wherein manually operable means passing through the said plate is actuable to slide the said axially slidable gear over the said key so as to disconnect it from the gear on the said output shaft.

2. An electrical driving unit according to claim 1 wherein the manually operable means comprises a snail cam mounted on one end of a rotatable shaft and having its operative face confronting the said mounting plate.

3. An electrical driving unit according to claim 2 wherein the operative face of the cam abuts an arm of a yoke, pivoted to the said mounting plate, another arm of which yoke engages a disc affixed to the axially slidable gear.

4. An electrical driving unit according to claim 3 wherein the disc is pressed towards the said other arm by a coil spring surrounding the freely rotatable hub of the wheel.

* * * * *